No. 765,038. PATENTED JULY 12, 1904.
O. OHLSSON.
SUPPORTING DEVICE FOR RAPIDLY ROTATING PARTS.
APPLICATION FILED JAN. 10, 1903.
NO MODEL. 3 SHEETS—SHEET 1.

WITNESSES:

INVENTOR
Olof Ohlsson
BY
ATTORNEY

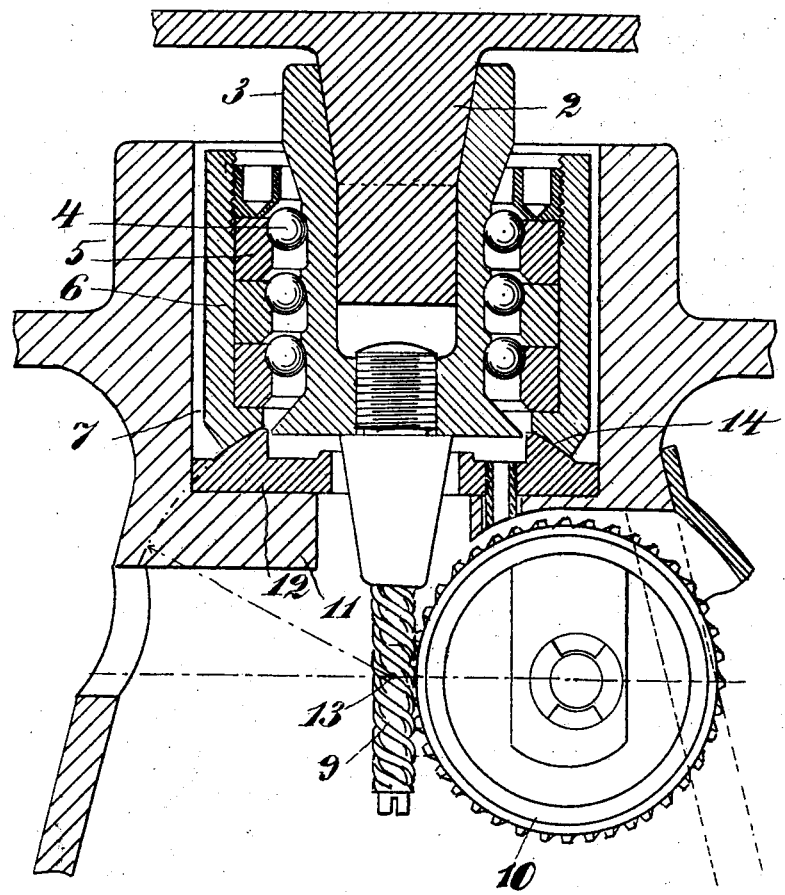

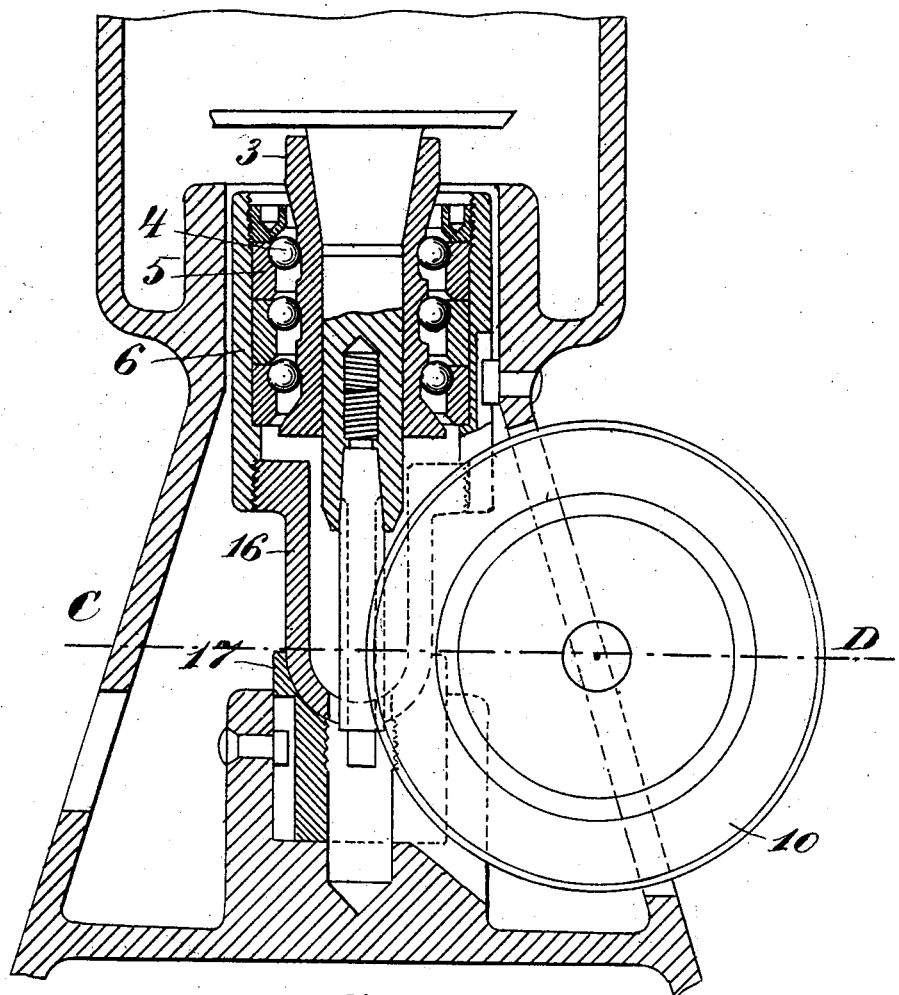
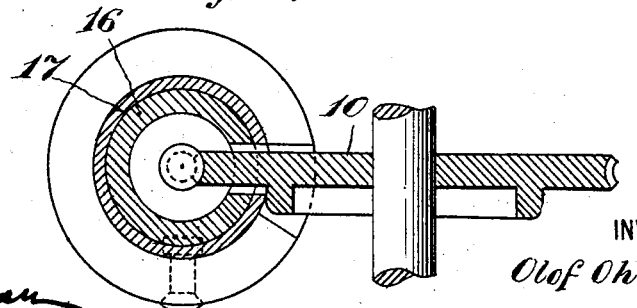

No. 765,038.

Patented July 12, 1904.

UNITED STATES PATENT OFFICE.

OLOF OHLSSON, OF SÖDERTELGE, SWEDEN, ASSIGNOR TO GUSTAF OSCAR WALLENBERG, OF STOCKHOLM, SWEDEN.

SUPPORTING DEVICE FOR RAPIDLY-ROTATING PARTS.

SPECIFICATION forming part of Letters Patent No. 765,038, dated July 12, 1904.

Application filed January 10, 1903. Serial No. 138,556. (No model.)

*To all whom it may concern:*

Be it known that I, OLOF OHLSSON, engineer, a subject of the King of Sweden and Norway, and a resident of Storgatan 14, Södertelge, in the Kingdom of Sweden, have invented certain new and useful Improvements in Supporting Devices for Rapidly-Rotating Parts, of which the following is a specification, reference being had therein to the accompanying drawings.

This invention relates to centrifugal machines and other rapidly-rotating apparatus, and particularly to the bearing devices for same, whereby the action of the power transmission and the gearing will not have a disturbing effect upon the centering of the driven part. Hitherto efforts to achieve this end have been commonly directed to a link or swivel-like coupling on the shaft, pendulous suspension of the drum, or other part, &c. All such arrangements are, however, unsuitable for a machine which is to be operated by any unskilled person.

According to this invention the object aimed at is gained by the employment of only one bearing, and, further, by so arranging the bearing that the part to be driven—which in the present case may be taken as a centrifugal drum—and shaft as a whole system can in a pendulous manner swing somewhat to the side about a point situated immediately beneath the bearing, and, finally, by arranging the power transmission at the point named. By this means the drum is as free as possible at the upper extremity, so that as soon as the rotatory speed has become so great that the centripetal force comes into play the drum will immediately place itself in a position of equilibrium. With this machine there is thus no danger, as is the case with the ordinary machine hitherto used provided with several spring-bearings, spring-shaft, or the like, of the drum becoming decentered, as it, on the contrary, constantly strives to maintain the position of equilibrium, like a free peg-top.

Figure 1:
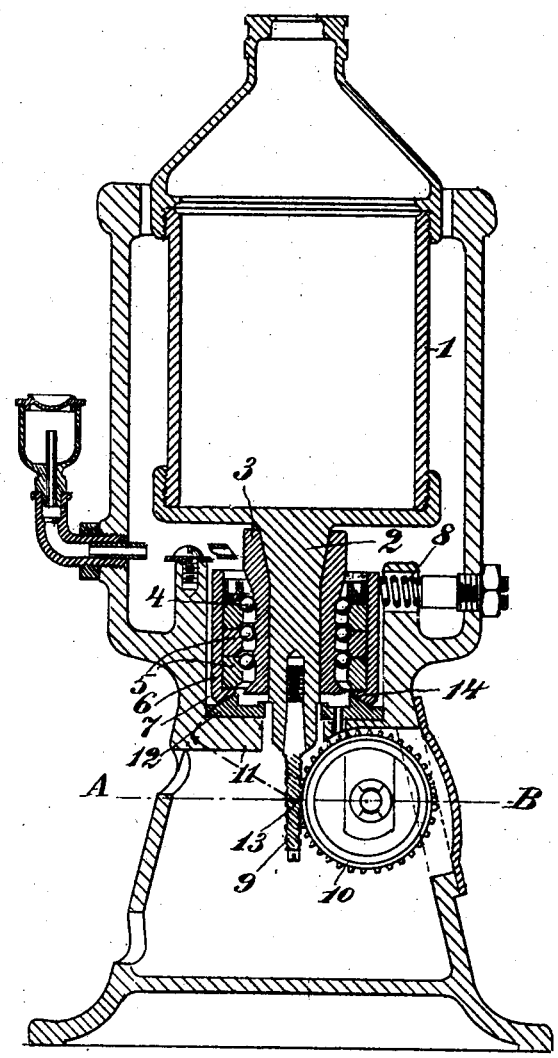
Figure 2:
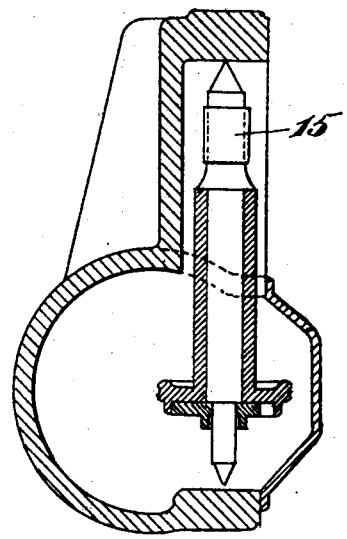

Figure 1 shows the bearing and driving mechanism, in axial section, of a centrifugal machine viewed from the side. Fig. 2 is a horizontal section on the line A B of Fig. 1. Fig. 3 shows a modification on a larger scale. Fig. 4 is a vertical sectional view, on an enlarged scale, of another modification; and Fig. 5 is a horizontal section on the line C D of Fig. 4.

As shown, the rotating system, consisting of the drum 1 and the shaft or extension 2, is made as low or concentrated in a vertical direction as possible apart from the height of the drum itself, which is effected by the fact that the bearing, which at the same time serves as the step-bearing and as the side bearing, is placed quite near the drum and by the fact that the driving-shaft is placed quite near the bearing beneath the latter. The bearing parts are the inner socket 3, the balls 4, the rings 5, forming the ball-races, and the outer socket or sleeve 6, assembled in a way previously known, so that they can be easily taken apart. The short shaft 2 is conically enlarged toward the top and by friction carries with it the socket 3 in its rotation. The bearing is located in a chamber 7 in the frame, which chamber is somewhat wider than the cup 6 in order to permit a certain amount of lateral motion for the rotating system. Spiral springs 8, pressing radially against the sleeve, form a yielding support for the latter from the outside. These springs are so arranged in the frame that they can be easily adjusted. In the lower extremity of the shaft 2 worm 9 is secured, engaging with a worm-wheel 10. As already mentioned, the worm-gear thus formed is placed quite near the bearing under the base 11 of the chamber 7, which base is provided with a central opening for the insertion of the shaft. On the said base is placed a loose bottom plate 12 with a spherically-rounded upper surface, upon which the correspondingly-formed lower surface of the sleeve 7 bears. The center point 13, of a circumference of which said spherical surface forms a part, is situated on a horizontal level with the shaft of the worm-wheel 10, and on the vertical central line of the shaft 2, or nearly so. The effect of such arrangement will be easily understood from the foregoing. While at work the rotating system can assume a position suitable for balancing by making a small lateral movement, owing to the fact that the bearing-sleeve can glide on the spherical guide-surface 14. The small height of the whole has the effect that even if the angle of lateral movement is quite appreciable the circle is still very small, and at the point 13, where the gearing acts upon the shaft, the movement referred to is practically *nil*, or at least infinitesimal. It will be seen from this that the gearing and the automatic balancing aimed at have extremely slight influence upon each other. There is obviously no obstacle to the employment of other kind of gearing—for instance, cylindrical toothed gearing or belt-gearing with the pinion or belt-pulley situated at the point 13 or near the latter or a turbine-wheel or the like situated at the same point. For a hand centrifugal machine, as shown in the drawings, the worm-gearing is, however, considered to be the best. The worm-wheel is driven by a suitable toothed gearing. Only a pinion 15, Fig. 2, of the latter is, however, shown in the drawings. In the gearing there is provided, as is customary, a clutch or the like for stopping purposes.

In the modification Fig. 3 the socket 3 is provided with a base in which the worm 9 is screwed fast. The shaft 2, inserted in and removable from the socket, participates in the latter's rotation by frictional engagement. In this way the advantage is obtained that the drum can be lifted up out of the frame independently of the gearing. In order that the shaft 9 can be exchanged for a new one, if required, it is detachably screwed into the shaft or socket. Finally it may be observed that the construction described has advantages quite apart from the possibility for the drum and shaft to undergo lateral motion. For it is well known that vibration in the shaft when the latter is firmly connected with the drum has a disturbing effect upon the drum's steady running.

In the modification shown in Figs. 4 and 5 the outer socket 6 of the bearing is elongated downward by means of a part 16, which is screwed to the socket and supports the same, resting in a hollow pan 17, mounted in the frame of the apparatus. The said pan 17, which thus corresponds to the bottom plate 12, (shown in Fig. 1,) is situated substantially on a horizontal level with the shaft of the worm-wheel 10. The part 16 has a side opening, through which the worm-wheel 10 passes to the worm 9. Yielding side supports (not shown in Fig. 4) are provided at the top of the bearing in the same manner as shown in Fig. 1, so that the shaft and the bearing are capable of making a small lateral movement, as stated above, while the socket is supported by the pan 17 in the same manner as a pivot. Thus the difference between the arrangement shown in Fig. 4 and that shown in Fig. 1 only consists in the fact that the supporting-point of the bearing is lowered to the level of the gearing, or substantially so. At the same time the part 16 forms a protecting-socket inclosing the worm 9. The said socket is screwed to socket 6 in order to be easily removed.

The disadvantage mentioned above and consisting in the disturbing effect which vibrations in the shaft have upon the steady running of the drum does not exist in apparatus arranged in accordance with my invention, owing to the fact that the shaft is quite short and the power transmission takes place at a point situated beneath the bearing immediately under the drum. The shaft is simply a short projection from the drum elongated by a quite narrow screw for gearing or by a small extension provided with a belt-pulley. This in itself insures that the drum is as far as possible free from lateral influence, from shaft tensional strain, bearing-pressure, or the like.

Having now described my invention, what I claim as new, and desire to secure by Letters Patent, is—

1. A device for the purpose set forth, comprising an upright shaft to carry the part to be rotated, an inner tubular socket on said shaft, an outer, rocking socket down through which the shaft and its inner socket extend, a ball-bearing in the annular space between the said sockets and supporting the inner socket, a fixed support under the outer, rocking socket, and means for driving the shaft, the outer socket and its support having spherical bearing-surfaces the curve of which is drawn from the center substantially coincident with the point on the shaft where the driving power is applied.

2. A device for the purpose specified, comprising an upright shaft to carry the part to be rotated, an inner tubular socket on said shaft, an outer, rocking socket down through which the inner socket and shaft extend, a ball-bearing for the inner socket in the annular space between the two sockets, a fixed support under the outer, rocking socket, means for driving the shaft, and radially-disposed springs forming yielding lateral supports for the outer socket near its top, the outer socket and its bottom support having spherical surfaces the curve of which is drawn from a center substantially coincident with the point on the shaft where the driving power is applied.

3. A device for the purpose set forth, comprising an upright shaft to carry the part to be rotated, an inner tubular socket on said shaft, an outer, rocking socket down through which the shaft and its inner socket extend, a ball-bearing in the annular space between the said sockets and supporting the inner socket, a fixed support under the outer, rocking socket, and means for driving the shaft, the support of the outer socket having an upper, convex, spherical surface and the said socket having a lower, concave spherical surface resting on the support, the curve of which is drawn from a center substantially coincident with the point on the shaft where the power is applied, and said point being below said rocking bearing.

4. A device for the purpose specified, comprising an upright tapered shaft to carry the part to be rotated, an inner tubular socket 3 in which said shaft is fitted, an outer socket 6, about the socket 3, rings 5 superposed in the socket 6, balls 4 in superposed series between the rings 5 and inner socket 3, an apertured plate 12 having a spherical upper surface on which the socket 6 finds a rocking support, a fixed support for the plate 12, means for driving the shaft from a point 13 below the plate 12, and radially-disposed springs 8 which press upon the sides of the socket 6 near its top and form a yielding lateral support, substantially as set forth.

5. A device for the purpose specified, comprising an upright shaft to carry the part to be rotated, said shaft having a removable, pendent extension at its lower part, a tubular inner socket 3 in which the shaft is fitted, an outer rocking socket 6, a plurality of superposed ball-bearings between said sockets, a support for said outer socket, and means for driving said shaft, the point where the driving power is applied being situated below the socket-support, substantially as set forth.

In witness whereof I have hereunto signed my name in the presence of two subscribing witnesses.

OLOF OHLSSON.

Witnesses:
ERNST SVANQVIST,
ROBERT APELGREN.